(12) United States Patent
Bonanni et al.

(10) Patent No.: US 9,043,321 B2
(45) Date of Patent: May 26, 2015

(54) ENHANCING CLUSTER ANALYSIS USING DOCUMENT METADATA

(75) Inventors: Cristina Bonanni, Rome (IT);
Francesco Dauri, Rome (IT);
Arcangelo Di Balsamo, Aprilia (IT);
Alessandro Donatelli, Rome (IT);
Giovanni Falchetti, Rome (IT); Luca Lazzaro, Naples (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 291 days.

(21) Appl. No.: 13/411,126

(22) Filed: Mar. 2, 2012

(65) Prior Publication Data
US 2013/0006990 A1    Jan. 3, 2013

Related U.S. Application Data

(63) Continuation of application No. 13/172,186, filed on Jun. 29, 2011, now Pat. No. 8,849,811.

(51) Int. Cl.
*G06F 17/30* (2006.01)

(52) U.S. Cl.
CPC ............... *G06F 17/30705* (2013.01)

(58) Field of Classification Search
CPC .................................. G06F 17/30643
USPC ........................ 707/722, 728, 731
See application file for complete search history.

(56) References Cited

U.S. PATENT DOCUMENTS

| | | | |
|---|---|---|---|
| 7,502,765 B2 | 3/2009 | Kummamuru et al. | |
| 7,529,784 B2 * | 5/2009 | Kavuri et al. | 1/1 |
| 7,536,384 B2 | 5/2009 | Venkataraman et al. | |
| 7,685,084 B2 * | 3/2010 | Sisk et al. | 706/45 |
| 8,219,552 B2 * | 7/2012 | Deng et al. | 707/728 |
| 8,423,551 B1 | 4/2013 | Ben-Artzi et al. | |
| 2002/0049705 A1 * | 4/2002 | Haviv-Segal et al. | 707/1 |
| 2005/0210008 A1 * | 9/2005 | Tran et al. | 707/3 |
| 2006/0117002 A1 | 6/2006 | Swen | |
| 2007/0011110 A1 * | 1/2007 | Selvaraj et al. | 706/12 |
| 2007/0033220 A1 | 2/2007 | Drucker et al. | |
| 2007/0038601 A1 * | 2/2007 | Guha | 707/3 |
| 2007/0094294 A1 | 4/2007 | Ellsworth et al. | |
| 2007/0174296 A1 * | 7/2007 | Gibbs et al. | 707/10 |
| 2007/0192293 A1 * | 8/2007 | Swen | 707/3 |
| 2008/0005086 A1 * | 1/2008 | Moore | 707/3 |
| 2008/0086457 A1 * | 4/2008 | Fei et al. | 707/3 |
| 2008/0263022 A1 | 10/2008 | Kostorizos et al. | |
| 2008/0313179 A1 * | 12/2008 | Trepess et al. | 707/5 |
| 2009/0037409 A1 | 2/2009 | Singh et al. | |
| 2009/0043824 A1 * | 2/2009 | Claghorn | 707/200 |
| 2009/0094210 A1 | 4/2009 | Reinhardt et al. | |

(Continued)

*Primary Examiner* — Noosha Arjomandi
(74) *Attorney, Agent, or Firm* — Patents on Demand P.A.; Brian K. Buchheit; Scott M. Garrett

(57) ABSTRACT

A search query including search criteria can be received. The search criteria can be a text string. An enhanced search against an enhanced index can be executed. The enhanced index can be metadata associated with an enhanced cluster. The enhanced cluster can be a document cluster associated with the metadata. The enhanced cluster can be aggregated into a merged document. The merged document can be a document including the enhanced cluster contents. The ranking algorithm can be executed on the merged document to obtain a final ranking of content within the single document.

15 Claims, 6 Drawing Sheets

(56) References Cited

U.S. PATENT DOCUMENTS

| | | |
|---|---|---|
| 2009/0119261 A1 | 5/2009 | Ismalon |
| 2009/0271179 A1* | 10/2009 | Marchisio et al. .............. 704/9 |
| 2009/0307209 A1* | 12/2009 | Carmel et al. ................. 707/5 |
| 2010/0121842 A1* | 5/2010 | Klinkott ...................... 707/722 |
| 2011/0055192 A1 | 3/2011 | Tang et al. |
| 2012/0011124 A1 | 1/2012 | Bellegarda et al. |
| 2012/0030244 A1* | 2/2012 | John et al. .................... 707/797 |
| 2012/0089612 A1* | 4/2012 | Collins et al. ................ 707/747 |
| 2012/0191711 A1 | 7/2012 | Ayars et al. |
| 2013/0024467 A1* | 1/2013 | Miller .......................... 707/756 |
| 2013/0262385 A1* | 10/2013 | Kumarasamy et al. ....... 707/634 |
| 2013/0332445 A1* | 12/2013 | Opalinski et al. ............. 707/711 |

\* cited by examiner

500 a. Add (or update) a row in Document table with title = TITLE, path = PATH b. For each TAG in TAG_LINE do the following:
    i. If a row in Cluster table with name TAG does not exist, add it
    ii. Add a row in Document_cluster with Cluster table = TAG, Path = PATH c. For each LINK in the document:
    i. If a row in Cluster table with name LINK.CATEGORY does not exist, add it
    ii. If a row in Document table with title = "" and path = LINK.DOCUMENT_PATH does not exist, add it.
    iii. If a row in Document_cluster with (Cluster = LINK.CATEGORY, Path= LINK.DOCUMENT_PATH) does not exist, add it d. Assume MAIN_TOPIC as the main topic of the document, in the table of contents tree.

e. If a row in Cluster table with name MAIN_TOPIC.NAME does not exist, add it.

f. Add a row in Document_cluster with (Cluster = MAIN_TOPIC.NAME, Path = PATH)

FIG. 5

```
<?xml version="1.0" encoding="UTF-8"?>
<list query="system profile">
  <cluster id="0" label="Profiles Page" score="1.0">
    <document id="0" title="Organizing and editing system profiles" url="/com.ibm.tivoli.tpm.osdimg.doc/deploy/tosd_edsysprof_aix.html"   score="0.83348995" type="html"/>
    <document id="1" title="Organizing and editing system profiles" url="/com.ibm.tivoli.tpm.osdimg.doc/deploy/tosd_edsysprof_linux.html" score="0.83348995" type="html"/>
    <document id="2" title="Organizing and editing system profiles" url="/com.ibm.tivoli.tpm.osdimg.doc/deploy/tosd_edsysprof_ppc.html" score="0.83348995" type="html"/>
    <document id="3" title="Organizing and editing system profiles" url="/com.ibm.tivoli.tpm.osdimg.doc/deploy/tosd_edsysprof_solaris.html" score="0.83348995" type="html"/>
  </cluster>

•
                      •
                      •

<cluster id="6" label="concept" score="0.10787821">
    <document id="42" title="System profiles" url="/com.ibm.tivoli.tpm.osdimg.doc/deploy/cosd_sysprofiles_aix.html" score="1.0" type="html"/>
    <document id="43" title="System profiles" url="/com.ibm.tivoli.tpm.osdimg.doc/deploy/cosd_sysprofiles_linux.html" score="0.9922791" type="html"/>
    <document id="44" title="System profiles" url="/com.ibm.tivoli.tpm.osdimg.doc/deploy/cosd_sysprofiles_solaris.html" score="0.99061453" type="html"/>
    <document id="45" title="System profiles" url="/com.ibm.tivoli.tpm.osdimg.doc/deploy/cosd_sysprofiles_win.html" score="0.98979527" type="html"/>
  </cluster>
</list>
```

ENHANCING CLUSTER ANALYSIS USING DOCUMENT METADATA

CROSS-REFERENCE TO RELATED APPLICATIONS

This application is a continuation of U.S. patent application Ser. No. 13/172,186, filed Jun. 29, 2011, which is incorporated herein in its entirety.

BACKGROUND

The present invention relates to the field of cluster analysis. In today's computing environment, a wealth of resources such as Web pages and documents are often available to a user. Frequently, users utilize search engines to quickly identify relevant resources. Traditional search engines often utilize textual analysis to determine a relevant result. For example, keywords within a document can be matched to a user search string to establish a useful search result.

BRIEF SUMMARY

One aspect of the present invention can include a system, a computer program product, an apparatus, and a method for enhancing cluster analysis using document metadata. A search query including search criteria can be received. The search criteria can include at least one text string. An enhanced search against an enhanced index can be executed. The enhanced index can be metadata associated with an enhanced cluster. The enhanced cluster can be a document cluster associated with the metadata. The enhanced cluster can be aggregated into a merged document. The merged document can be a document including the enhanced cluster contents. The ranking algorithm can be executing on the merged document to obtain a final ranking of content within the single document.

Another aspect of the present invention can include a method, a computer program product, an apparatus, and a system for enhancing cluster analysis using document metadata. An enhanced engine can establish an enhanced cluster based on a search criteria and a metadata associated with a document within the enhanced cluster. The enhanced cluster can be a dataset of a set of documents. A data store can be configured to persist an enhanced index and the enhanced cluster. The enhanced index can be a database index of metadata associated with the enhanced cluster. The enhanced cluster can be a cluster entity and a document entity within a database.

BRIEF DESCRIPTION OF THE SEVERAL VIEWS OF THE DRAWINGS

FIG. 5 is a schematic diagram illustrating an exemplary algorithm for enhancing cluster analysis using document metadata in accordance with an embodiment of the inventive arrangements disclosed herein.

FIG. 6 is a schematic diagram illustrating a taxonomy for enhancing cluster analysis using document metadata in accordance with an embodiment of the inventive arrangements disclosed herein.

DETAILED DESCRIPTION

Figure 1:
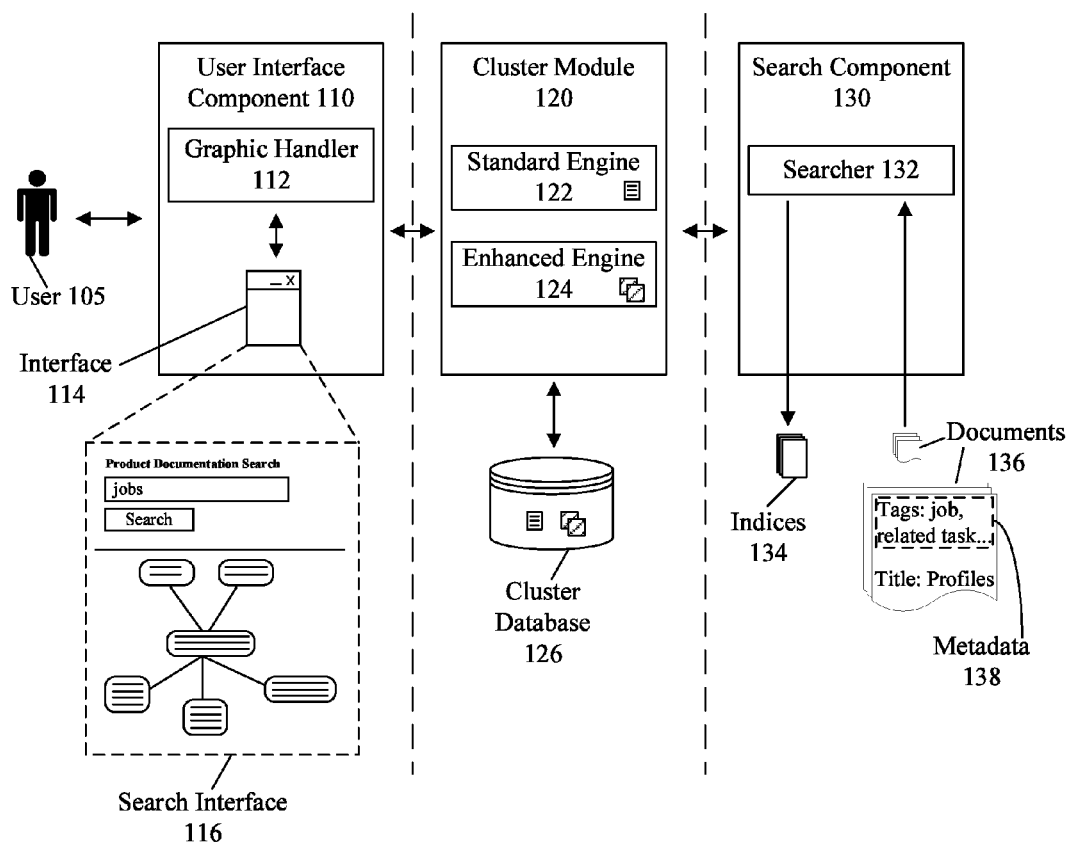
FIG. 1 is a schematic diagram illustrating a system for enhancing cluster analysis using document metadata in accordance with an embodiment of the inventive arrangements disclosed herein.

Traditional search algorithms can often capabilities to assess document classification and other metadata available in the documents, which can yield helpful results. One approach to address this shortcoming is implementing cluster analysis to group search results. Grouping search results can often produce highly relevant outcomes that traditional search engines can often miss. Cluster analysis can often use document classification to group relevant results. However, searching for information based on the document classification can omit critical results when information is not present in the expected document classification. For instance, when a search is executed on product manuals, a pivotal demonstrative example can be omitted among the search results. These problems were discovered and resolved in the course of the present disclosure.

That is, the present disclosure is a solution for enhancing cluster analysis using document metadata. In the solution, a traditional cluster analysis can be improved utilizing document metadata provided by a document author. In one instance, a traditional cluster analysis can be performed prior to an enhanced cluster analysis. In the instance, the result of the traditional cluster analysis can be combined with the result of the enhanced cluster analysis to provide improved results. Specialized ranking algorithms and/or formulas can be employed to provide outcomes. For example, a traditional visual search can be improved using the disclosure which can present relevant documents to a user which can be absent in the traditional visual search.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for enhancing cluster analysis using document metadata in accordance with an embodiment of the inventive arrangements disclosed herein. System 100 can be present in the context of system 200, method 300, and interface 400. System 100 architecture can be encapsulated within the functional units 110-130. System 100 can permit searching documents 136 utilizing search interface 116. It should be appreciated that system 100 improves upon existing cluster based search technology by utilizing an metadata 138 (e.g., keyword tags). System 100 can employ metadata to provide semantically aware searching capabilities presently lacking in traditional cluster analysis. For example, a user 105 can be presented with a relevant Web page when searching a knowledge base by a product manual category.

As used herein, standard clustering can be traditional data clustering utilizing conventional clustering approaches including, but not limited to, statistical data analysis, data mining, textual analysis, and the like. Enhanced clustering can improve upon standard clustering by utilizing metadata (e.g., metadata 138) associated with documents (e.g., documents 136) to generate enhanced cluster datasets. The metadata can be used to indicate conceptually similar documents 136. For example, a metadata tag can be defined for documents which describe different aspects of a software configuration process. That is, semantically related documents 136 can be identified and presented within a search result using an enhanced cluster search.

System 100 components 110-130 can be communicatively linked together and can act in unison to provide an enhanced cluster based search. Data can be freely exchanged between components utilizing traditional and/or proprietary data exchange formats and/or protocols. It should be appreciated that system 100 can be a component of a larger search based framework. In one instance, system 100 can be a component of a Service Oriented Architecture. That is, components 110-130 can be logically and/or physically distributed throughout a networked computing environment, a distributed computing environment, a cloud-based computing system, and the like.

In user interface component 110, a graphic handler 112 can permit the presentation of a search interface 116. Search interface 116 can include, a search input, a search result presentation area, and the like. For example, search interface 116 can conform to a split screen configuration similar to interface 410. In one embodiment, search interface 116 can include a visual search result section (e.g., visual results 420) and a textual search result section (e.g., text results 422). Component 110 can permit user 105 interaction with search interface 116 providing relevant feedback during the search process. Component 110 can invoke search component 130 which can perform an enhanced cluster analysis based search utilizing engine 124.

In cluster module 120, a standard engine 122 and an enhanced engine 124 can be present, allowing simultaneous searching based on user 105 provided criteria. Engine 122 can utilize traditional cluster analysis leveraging data structures associated with documents 136 to group search results. Engine 122 can employ metadata 138 to discover semantic meaning and connections among documents 136 which can enrich search results. In one instance, engine 122, 124 output can include document cluster datasets which can be stored within a cluster database 126.

In search component 130, a searcher 132 can examine indices 134 to determine search results based on user 105 specified criteria. Indices 134 can be generated by searcher 132 from documents 136. Indices 134 can include a standard cluster index and/or an enhanced cluster index. The standard cluster index can include keyword data present within documents 136. The enhanced cluster index can include metadata 138 (e.g., tags, author provided metadata) which can be leveraged to provide meaningful search results. Component 130 can operate in tandem with cluster module 120 to create a search result based on user 105 query.

Drawings presented herein are for illustrative purposes only and should not be construed to limit the invention in any regard. It should be appreciated that one or more functional units can be merged and/or separated based on implementation requirements. It should be understood that metadata 138 can be provided by a document 136 author, reviewer, administrator, supervisor, and the like. In one instance, a mapping of related tag keywords (e.g. metadata 138) can be maintained to enable rapid identification of relevant documents 136. It should be appreciated that standard engine 122 can be an optional component of system 100.

Figure 2:
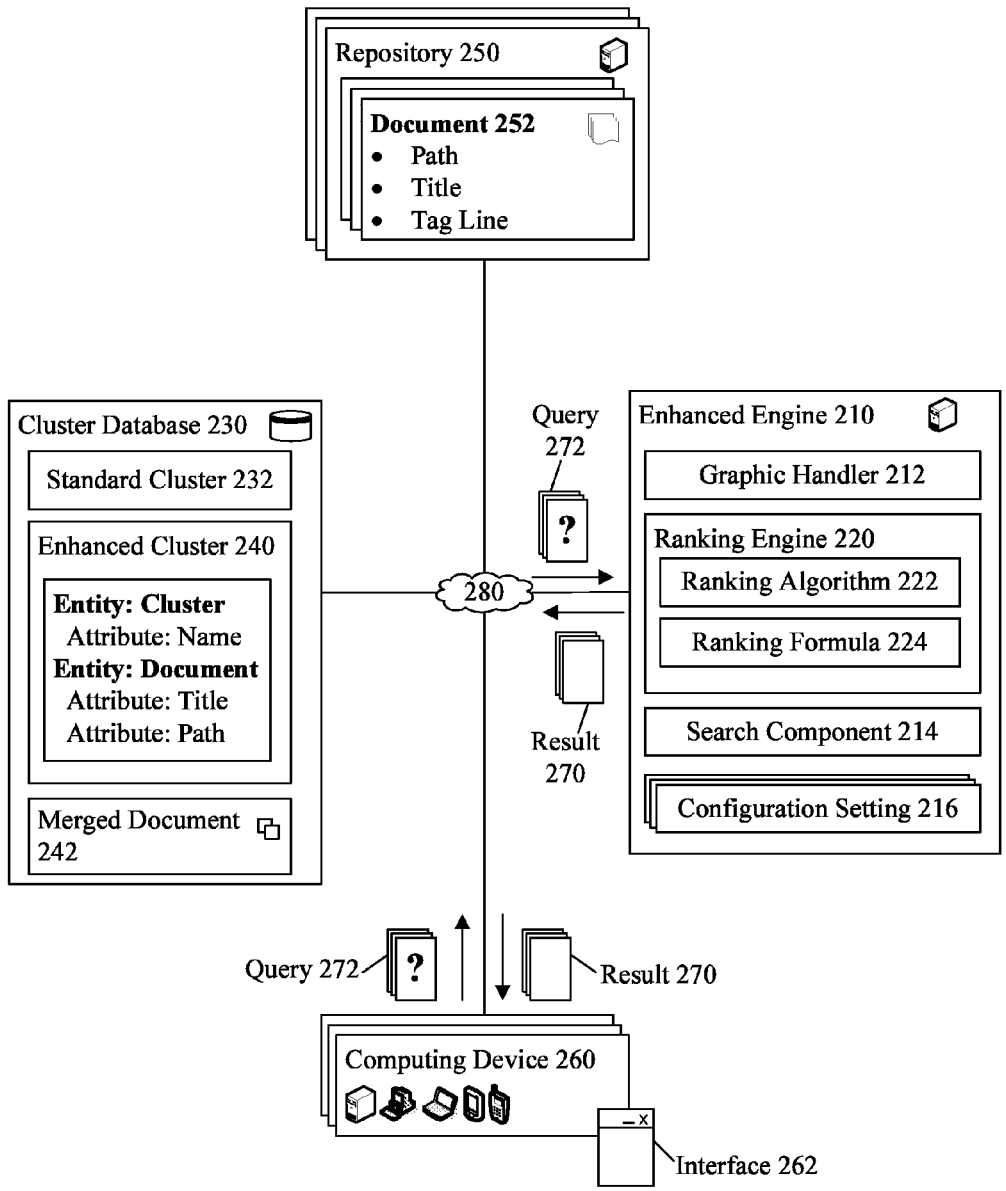
FIG. 2 is a schematic diagram illustrating a system for enhancing cluster analysis using document metadata in accordance with an embodiment of the inventive arrangements disclosed herein.

FIG. 2 is a schematic diagram illustrating a system 200 for enhancing cluster analysis using document metadata in accordance with an embodiment of the inventive arrangements disclosed herein. System 200 can be present in the context of system 100, method 300, and/or interface 400. In system 200, components 210, 230, 250, 260 can facilitate an enhanced cluster based search. Components 210, 230, 250, 260 can be communicatively linked via network 280. Network 280 can include one or more networks cooperatively functioning to provide data exchange between elements 210, 230, 250, 260. It should be appreciated that the enhancement of standard clusters provided by system 200 can allow the creation of a homogenous clustered search engine. That is, the search engine can include a graphical representation of document information without neglecting the documents contents, document structure, and/or meta-information specified by authors. System 200 can enhance standard cluster analysis by populating a database with information for enhanced clusters, building a set enhanced clusters, and defining a ranking for the enhanced clusters. It should be understood that system 200 can include standard clusters (e.g., standard cluster 232).

System 200 functionality can include, but is not limited to, database 230 population, indices (e.g., indices 134) creation, database 230 synchronization, and the like. For example, as a document 252 changes, document properties can be analyzed and cluster 232, 240 can be dynamically updated when necessary. System 200 can utilize one or more traditional and/or proprietary clustering processes including, but not limited to, hierarchal clustering, partitioned clustering, spectral clustering, and the like.

Enhanced engine 210 can be a hardware/software component able to generate result 270 based on a search query. Engine 210 can include, but is not limited to graphic handler 212, ranking engine 220, search component 214, configuration setting 216, and the like. Engine 210 functionality can include, but is not limited to, search query 262 processing, cluster 240 generation, merged document 242 creation, result 270 genesis, and the like. In one instance, engine 210 can be an element of a search engine. For example, engine 210 can be a functionality of a search engine appliance. In one embodiment, engine 210 can populate database 230 with enhanced cluster 240 based on document 252 within repository 250. In the embodiment, engine 210 can build a set of clusters (e.g., enhanced cluster 240) and define an appropriate ranking for the clusters. For example, document properties (e.g., path, title, tagline) can be utilized to populate the database 230. In one instance, engine 210 can be a component of an IBM TIVOLI software.

Graphic handler 212 can be a hardware/software element able to present result 270 within interface 262. Handler 212 functionality can include, graphical rendering, animation, and the like. In one instance, handler 212 can be a component of an interface 262. For example, handler 212 can be a Web browser plug-in able to present a visual search result interface. In one instance, handler 212 can process an Extensible Markup Language document (e.g., result 270) and graphically render a search result graph within interface 262. For example, handler 212 can present an appropriate tree graph of a search result each time a user interacts with a search result within section 420.

Ranking engine 220 can be a hardware/software element for performing ranking on one or more clusters. Engine 220 can include, but is not limited to, ranking algorithm 222, ranking formula 224, and the like. Engine 220 functionality can include, sorting, clustering, and the like. Ranking algorithm 222 can be a set of instructions for determining the relevance of a cluster. Algorithm 222 can utilize ranking formula 224 to rank enhanced cluster 240. In one embodiment, algorithm 222 can temporarily merge documents (e.g., merged document 242) within a cluster to determine cluster relevance. In the embodiment, merged document 242 can be assessed utilizing ranking formula 224. It should be appreciated that algorithm can include multiple algorithms 222 which can be performed in parallel and/or serial. Ranking formula 224 can be an adjustable formula for determining cluster 240 relevance.

It should be appreciated that the search processes can be different between the two clustering approaches (e.g., standard and enhanced), a new ranking can be required to order search results in a more accurate fashion compared to the user query results. The ranking can be applied to clusters since clusters can be the first result available to the user. To rank a cluster, the entire set of document associated to the cluster can be temporarily merged into a single document (e.g., merged document). A search algorithm can be performed on the merged document which can calculate the document relevance. The result can be used as cluster relevance. When a tagline is utilized, a weighted average can be defined. It should be understood that the search algorithm can provide a real number as document relevance to the query. Ranking values can be normalized with respect to the value of the best score (e.g., assumed to be 1). That is the relevance for the clusters can be defined as a real number between 1 and 0. For enhanced clusters, the tag line can be considered. A tag line presence can be a Boolean information.

In one instance, ranking formula 224 can utilize a tag line presence, weighting values, and/or tuning parameters to obtain a cluster ranking. In the instance, a tag line presence can be an integer value (e.g., 0-1) indicating the presence of a tag line (e.g., document 252 property). In the instance, the weighting value can be a real number between zero and one which can indicate the relevance of an enhanced cluster. The cluster rank of the instance can be a value obtained by evaluating a merged document 242 relevance. For example, formula 224 can conform to a mathematical expression such as TAGL_HIT*HIT_WEIGHT+CLUSTER_RANK*(1−HIT_WEIGHT) where TAGL_HIT represents a tag line presence, a HIT_WEIGHT represents a tuning parameter, and CLUSTER_RANK represents a ranking value. It should be understood that formula 224 can include multiple tuning parameters, user selectable parameters, constant values, and the like.

Search component 214 can be a hardware/software component for processing query 272 and delivering result 270. Component 214 functionality can include, but is not limited to, information retrieval, document merging, and the like. In one instance, component 214 can retrieve cluster 232, 240 data which can be evaluated by ranking engine 220. In one embodiment, component 214 can aggregate cluster 232, 240 into a merged document 242. Component 214 can perform document retrieval actions in response to user selections of search result 270 within interface 262. For example, component 214 can utilize Hypertext Transport Protocol (HTTP) actions to obtain a document returned in the search result which can be hosted on a Web server.

Configuration setting 216 can be a one or more options for establishing the behavior of engine 210 and/or system 200. Setting 216 can include, but is not limited to, graphic handler 212 options, ranking engine 220 setting, algorithm 222 selection, ranking formula 224 options, component 214 parameters, and the like. Setting 216 can be heuristically determined and/or manually established. Setting 216 can be utilized to control database 230 population of cluster 232, 240, selection of document 252, repository selection 250, result 270 formatting, and the like.

Cluster database 230 can be a data store able to persist standard cluster 232 and/or enhanced cluster 240. Cluster database 230 can include, but is not limited to, standard cluster 232, enhanced cluster 240, merged document 242, indices (e.g., indices 134), and the like. Database 230 can conform to a relational database management system (RDBMS), object oriented database management system (OODBMS), and the like. Database 230 population can be performed using one or more traditional and/or proprietary mechanisms. In one embodiment, database 230 population can be performed utilizing a database population algorithm (e.g., pseudo-code 500) which can create relevant enhanced cluster 240. In the embodiment, pseudo-code 500 can be implemented employing any traditional and/or proprietary computing language. Pseudo-code 500 can add and/or update a document table with relevant attributes. One or more instructions of pseudo-code 500 can associate appropriate data (e.g., tag, link) with each document within the document table. Upon creation of necessary database information, cluster sets can be generated utilizing one or more algorithms. For example, when a document cluster pair with a path equivalent to a document path, the cluster can be added to a final taxonomy (e.g., taxonomy 600).

During enhanced clustering population, three elements can be assessed for each document. The elements can include, but is not limited to, a set of tags, (e.g., tag line), a link referencing to the document, a documentation table of contents, and the like. A link referencing the document can be defined by three attributes such as link title, document relative path, and link category. The table of contents can include a tree structure with documents associated with each tree leaf. The children of the root node can be classified as a main topic. Each document can include only one main topic. Each document can include attributes path, title, and tag line (e.g., document 252).

Standard cluster 232 can be a set of documents grouped together based on a standard cluster analysis. Cluster 232 can include document 252, documents stored within device 260, and the like. Cluster 232 can be automatically updated using traditional and/or proprietary mechanisms. In one instance, cluster 232 can be utilized to create a taxonomy which can be represented within result 270.

Enhanced cluster 240 can be a set of documents grouped together based on an enhanced cluster analysis. Cluster 240 can include document 252, documents stored within device 260, and the like. Cluster 240 can be automatically updated using traditional and/or proprietary mechanisms. In one embodiment, cluster 240 can include, but is not limited to, a cluster entity and a document entity. In the embodiment, cluster entity can include a name attribute and document entity can include a title and path attribute.

Merged document 242 can be a concatenated document including the contents of standard cluster 232 or enhanced cluster 240. Document 242 can be temporarily persisted during the creation of result 270. Document 242 can conform to one or more traditional and/or non-traditional formats including XML, HTML, text format, binary format, and the like. In one instance, document 242 can be persisted to enable rapid fulfillment of identical queries.

Repository 250 can be a hardware/software component able to persist document 252. Repository 250 can include one or more communicatively linked repositories, data stores, and the like. Repository 250 can include, but is not limited to, a Storage Area Network (SAN), Network Attached Storage (NAS), and the like. Repository 250 can conform to a relational database management system (RDBMS), object oriented database management system (OODBMS), and the like. In one instance, repository 250 can be a component of database 230. In one embodiment, repository can be a content management system. For example, repository can be a document repository storing user manuals and/or software product documentation.

Document 252 can be a electronic artifact stored within a repository 250. Document 252 properties can include, but is not limited to, a content, a path, a title, a tag line, and the like. Document 252 property path can be a relative path within a file system. Document 252 property title can be an author provided title associated with the document. Document 252 property tag line can be a set of tags denoting information about the document content. Document 252 can conform to any digital format which can be indexed within database 230. For example, document 252 can be a Hypertext Markup Language formatted document.

Computing device 260 can be a hardware/software entity for performing a search query within an interface 262. Device 210 can include, but is not limited to a desktop computer, a laptop computer, a tablet computing device, a portable media player, a portable digital assistant (PDA), a mobile phone, and the like. Device 210 can be communicatively linked to interface 262. Device 210 can include multiple computing devices 210, multiple interfaces 262, and the like. In one instance, device 260 can persist result 270 upon receipt.

Interface 262 can be a hardware/software element for executing a document 252 search. Interface 262 functionality can include, but is not limited to, document 252 viewing, result 270 presentation, setting 216 modification, and the like. Interface 262 can include, but is not limited to, a Web browser, a search application, a file manager, a document management program, and the like. In one embodiment, interface 262 can be identical to interface 410. In the embodiment, interface 410 can permit presentation of search results indicating the search query terms and related documents. For example, a graph can be presented for a search term "system profile" in section 420 and a traditional text based search result can be presented in section 422.

Result 270 can be a data set output of a search process associated with interface 262. Result 270 can include a partial search result output, an aggregate search result output, and the like. For example, result 270 can include the ten most relevant documents found from a search query 272. In one instance, result 270 can be an XML document which can include search result information. In the instance, result 270 can be generated from taxonomy 600. In one configuration, taxonomy 600 can include, but is not limited to, query parameters, cluster identifier, cluster relevance, document identifier, document path, document title, relevance rating, document type, and the like. It should be appreciated that document 600 is an exemplary document.

Query 272 can be a search query conforming to traditional and/or proprietary search conventions. Query 272 can include natural language text, Boolean expressions, and the like. Query 272 can be received by component 214 which can process the request based on query syntax, setting 216, and the like. Query 272 can conform to one or more standard and/or non-standard query languages including, but not limited to, Structured Query Language (SQL), Object Query Language (OQL), Contextual Query Language (CQL), and the like.

Network 280 can be an electrical and/or computer network connecting one or more system 200 components. Network 280 can include, but is not limited to, twisted pair cabling, optical fiber, coaxial cable, and the like. Network 280 can include any combination of wired and/or wireless components. Network 280 topologies can include, but is not limited to, bus, star, mesh, and the like. Network 280 types can include, but is not limited to, Local Area Network (LAN), Wide Area Network (WAN), Virtual Private Network (VPN) and the like.

Drawings presented herein are for illustrative purposes only and should not be construed to limit the invention in any regard. System 200 can communicate utilizing traditional and/or proprietary mechanisms. For example, query 272 and result 270 can be conveyed utilizing Asynchronous JavaScript and XML (AJAX) communication. In one embodiment, engine 210 can be a functionality of a Web-enabled service. In one embodiment, enhanced engine 210 can be a networked component. It should be appreciated that enhanced cluster 240 can be used in conjunction with a standard cluster 232. For example, cluster 240 can be used to filter standard cluster 232 to provide improved search accuracy.

Figure 3:
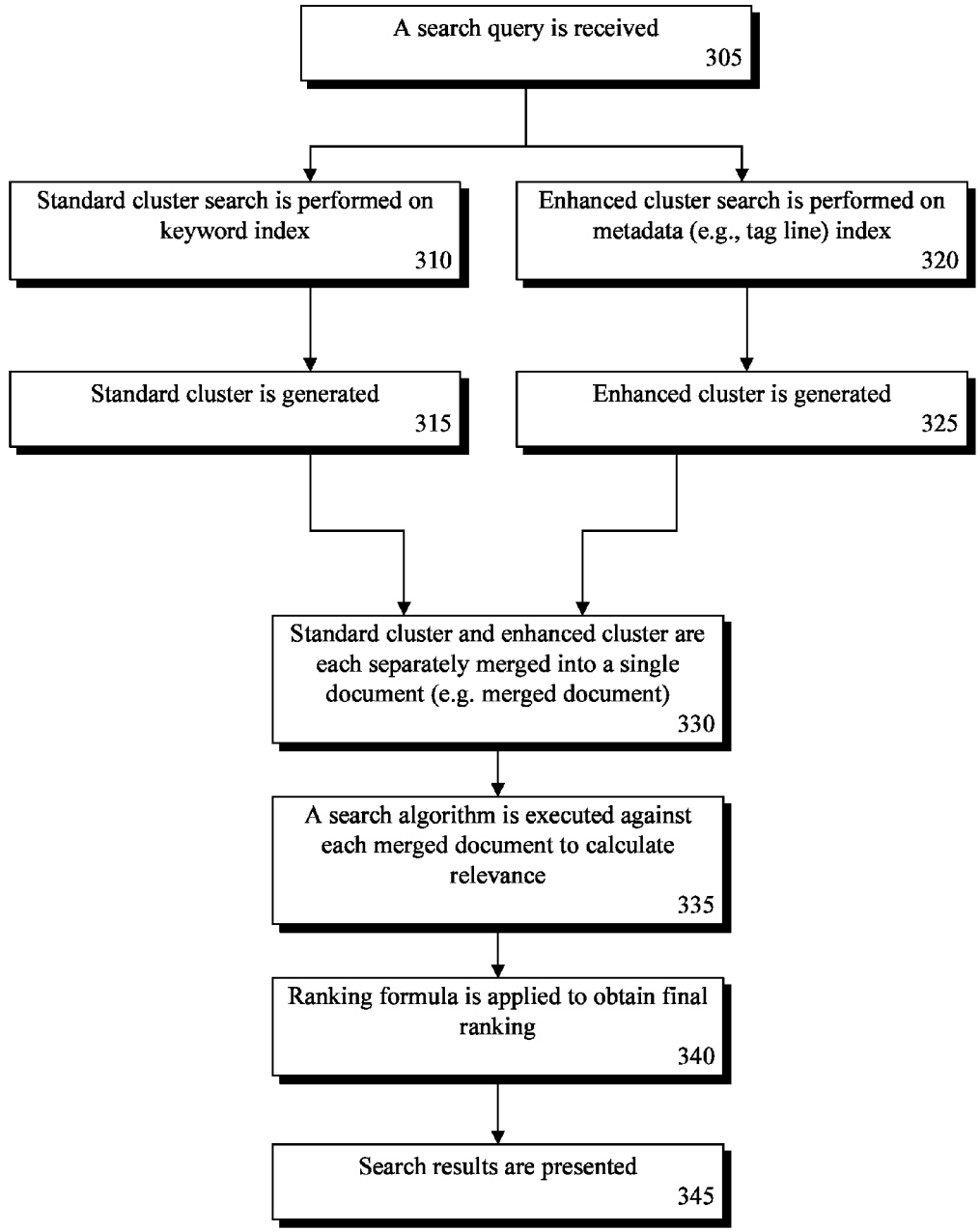
FIG. 3 is a schematic diagram illustrating a method for enhancing cluster analysis using document metadata in accordance with an embodiment of the inventive arrangements disclosed herein.
Figure 4:
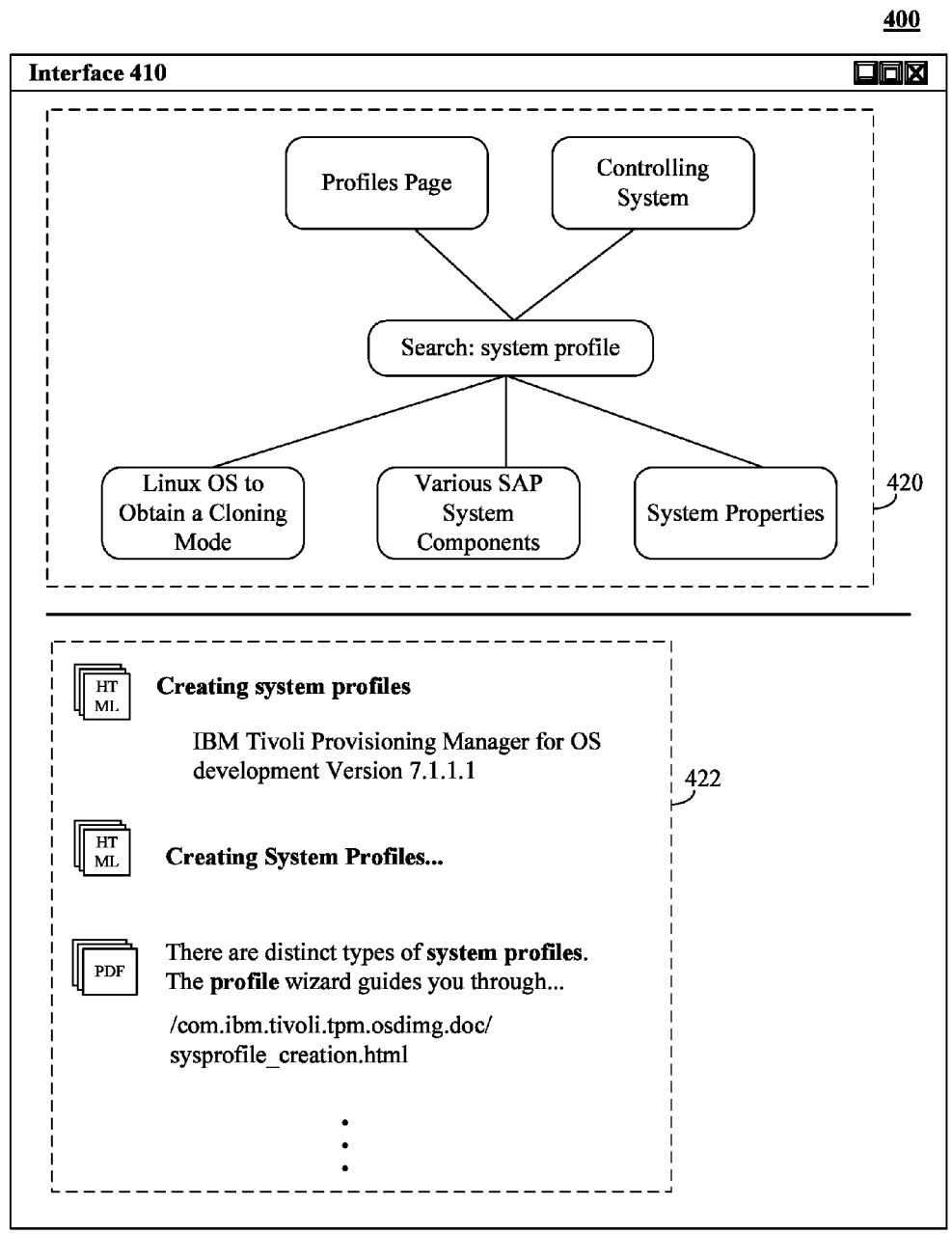
FIG. 4 is a schematic diagram illustrating an interface for enhancing cluster analysis using document metadata in accordance with an embodiment of the inventive arrangements disclosed herein.

FIG. 3 is a schematic diagram illustrating a method 300 for enhancing cluster analysis using document metadata in accordance with an embodiment of the inventive arrangements disclosed herein. Method 300 can be performed in the context of system 100, 200 and/or interface 400. In method 300, a search query can be received from a search interface (e.g., search interface 116). A standard and enhanced cluster based search can be performed upon indices. Search results can generated and evaluated to provide a finalized ranking. The finalized ranking can be organized into an ordered search result which can be presented.

In step 305, a search query can be received. In step 310, a standard cluster search can be performed on a keyword index. In step 315, a standard cluster can be generated. In step 320, an enhanced cluster search can be performed on a metadata (e.g., tag line) index. In step 325, an enhanced cluster can be generated. In step 330, the standard and enhanced clusters can be each separately merged into a single document. That is, a standard cluster can be merged into a document including standard cluster content and an enhanced cluster can be merged into a document including enhanced cluster content. In step 335, a search algorithm can be executed against each merged document to calculate document relevance. In step 340, a ranking formula can be applied to obtain a final ranking. The final ranking can be applied to the search result producing an organized search result based on relevance. In step 345, the search results can be presented.

Drawings presented herein are for illustrative purposes only and should not be construed to limit the invention in any regard. It should be appreciated that the method can be performed in parallel and/or serial. For example, steps 310-315 and 320-325 can be performed simultaneously on a computing device having multiple processor and/or cores. In one instance, cluster validation can be optionally performed to improve enhanced cluster creation and/or metadata selection. That is, conventional and/or non-conventional optimization processes can be associated with the method 300 to improve outcomes. It should be understood that method 300 can be a functionality of an algorithm permitting selective cluster based searching (e.g., standard clustering vs. enhanced clustering). That is, method 300 can be configured to perform enhanced cluster based searches exclusively.

The flowchart and block diagrams in the FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
receiving a search query comprising of at least one search criteria, wherein the at least one search criteria is a text string;
executing a search against an enhanced index, wherein the enhanced index is comprised of metadata associated with an enhanced cluster, wherein the enhanced cluster is a document cluster generated utilizing the metadata associated with documents, wherein the metadata is used to indicate conceptually similar documents;
aggregating the enhanced cluster each into a merged document, wherein the merged document is a document comprising of the enhanced cluster contents; and
executing a ranking algorithm on the merged document to obtain a final ranking of content within the merged document, wherein the metadata is a keyword tag, wherein the keyword tag is a product platform value, audience value, and a version revision.

2. The method of claim 1, further comprising:
performing a keyword search against a standard index, wherein the standard index is comprised of keywords obtained from a document within a standard cluster, wherein the standard cluster is a document cluster sharing a plurality of keywords; and
filtering the standard cluster against the enhanced cluster.

3. The method of claim 1, further comprising:
presenting a search result associated with the search query within an interface, wherein the search result is a document cluster comprising of a plurality of documents associated with a standard cluster and an enhanced cluster.

4. The method of claim 3, wherein the presenting conforms to a visual presentation comprising of a graph having a plurality of nodes, wherein the plurality of nodes is associated with an element of the search result.

5. The method of claim 3, wherein the search results conforms to an Extensible Markup Language format.

6. The method of claim 3, wherein the interface comprises a visual search result section and a textual search result section, wherein a tree graph is presented within the visual search result section for the search result when a user interacts with the search result.

7. The method of claim 1, further comprising:
populating a database with a tag, a link, and a table of contents associated with a document, wherein the document is associated with the enhanced cluster.

8. The method of claim 7, wherein the link is associated with a title attribute, a path attribute, and a category attribute.

9. The method of claim 7, wherein the database comprises of a cluster entity and document entity, wherein the cluster entity is associated with a name attribute, wherein the document entity is associated with a title attribute and a path attribute.

10. The method of claim 7, wherein the table of contents comprises a tree structure, wherein documents are associated with each tree leaf, wherein children of a root node of the tree structure are classified as a main topic.

11. The method of claim 1, wherein the merged document is generated through concatenating contents of documents of the enhanced cluster into a single document.

12. A method comprising:
receiving a search query comprising of at least one search criteria, wherein the at least one search criteria is a text string;
executing a search against an enhanced index, wherein the enhanced index is comprised of metadata associated with an enhanced cluster, wherein the enhanced cluster is a document cluster generated utilizing the metadata associated with documents, wherein the metadata is used to indicate conceptually similar documents;
aggregating the enhanced cluster each into a merged document, wherein the merged document is a document comprising of the enhanced cluster contents;
executing a ranking algorithm on the merged document to obtain a final ranking of content within the merged document; and
populating a database with a tag, a link, and a table of contents associated with a document, wherein the document is associated with the enhanced cluster.

13. The method of claim 12, wherein the link is associated with a title attribute, a path attribute, and a category attribute.

14. The method of claim 12, wherein the database comprises of a cluster entity and document entity, wherein the cluster entity is associated with a name attribute, wherein the document entity is associated with a title attribute and a path attribute.

15. A method comprising:
receiving a search query comprising of at least one search criteria, wherein the at least one search criteria is a text string;
executing a search against an enhanced index, wherein the enhanced index is comprised of metadata associated with an enhanced cluster, wherein the enhanced cluster is a document cluster generated utilizing the metadata associated with documents, wherein the metadata is used to indicate conceptually similar documents;
aggregating the enhanced cluster each into a merged document, wherein the merged document is a document comprising of the enhanced cluster contents;
executing a ranking algorithm on the merged document to obtain a final ranking of content within the merged document; and
presenting a search result associated with the search query within an interface, wherein the search result is a document cluster comprising of a plurality of documents associated with a standard cluster and an enhanced cluster, wherein the interface comprises a visual search result section and a textual search result section, wherein a tree graph is presented within the visual search result section for the search result when a user interacts with the search result.

\* \* \* \* \*